(12) United States Patent
Joseph, II (10) Patent No.: US 10,138,155 B2
(45) Date of Patent: Nov. 27, 2018

(54) APPARATUS AND METHOD FOR SEVERING A MOVING RIBBON OF INORGANIC MATERIAL

(71) Applicant: CORNING INCORPORATED, Corning, NY (US)

(72) Inventor: Michael Albert Joseph, II, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 179 days.

(21) Appl. No.: 15/101,104

(22) PCT Filed: Nov. 26, 2014

(86) PCT No.: PCT/US2014/067613
§ 371 (c)(1),
(2) Date: Jun. 2, 2016

(87) PCT Pub. No.: WO2015/084670
PCT Pub. Date: Jun. 11, 2015

(65) Prior Publication Data
US 2016/0304385 A1    Oct. 20, 2016

Related U.S. Application Data

(60) Provisional application No. 61/911,085, filed on Dec. 3, 2013.

(51) Int. Cl.
*C03B 33/08* (2006.01)
*C03B 17/06* (2006.01)
(Continued)

(52) U.S. Cl.
CPC ............ *C03B 33/08* (2013.01); *C03B 17/064* (2013.01); *C03B 21/02* (2013.01); *C03B 21/04* (2013.01);
(Continued)

(58) Field of Classification Search
CPC ..... C03B 33/08; C03B 33/04; C03B 33/0215; C03B 17/064; C03B 21/02; C03B 21/04; C03B 21/06
See application file for complete search history.

(56) References Cited

U.S. PATENT DOCUMENTS 1,720,883 A    7/1926    Campbell et al.
1,738,228 A    6/1929    Campbell et al.
(Continued)

FOREIGN PATENT DOCUMENTS

CN    101479202 A    7/2009
CN    102515483 A    6/2012
(Continued)

OTHER PUBLICATIONS

CN 202968366 machine translation, Shi et al., Glass Cutting Machine Guide System, has non-contacted guide mechanism installed on vertical glass ribbon, and substrate supporting mechanism installed on sucking disk-type breaking mechanical arm, Jun. 5, 2013.*

(Continued)

*Primary Examiner* — Queenie S Dehghan (57) ABSTRACT

A method includes indirectly engaging a surface of a moving ribbon of inorganic material with a non-contacting support unit. The ribbon is severed with a thermal separating unit while the non-contacting support unit is indirectly engaged with the ribbon.

11 Claims, 8 Drawing Sheets

(51) Int. Cl.
*C03B 21/02* (2006.01)
*C03B 21/04* (2006.01)
*C03B 21/06* (2006.01)
*C03B 33/02* (2006.01)
*C03B 33/04* (2006.01)

(52) U.S. Cl.
CPC .......... *C03B 21/06* (2013.01); *C03B 33/0215* (2013.01); *C03B 33/04* (2013.01); *B65G 2249/045* (2013.01)

(56) References Cited

U.S. PATENT DOCUMENTS

| | | |
|---|---|---|
| 1,744,045 A | 1/1930 | Halbach |
| 2,169,687 A | 11/1936 | Fowler et al. |
| 2,283,251 A | 5/1942 | Gunther |
| 2,584,851 A | 5/1946 | Dunipace |
| 3,231,356 A | 1/1966 | Giffen |
| 3,587,956 A | 6/1971 | Oelke |
| 3,737,294 A | 6/1973 | Dumbaugh, Jr. |
| 3,746,526 A | 7/1973 | Giffon |
| 3,849,097 A | 11/1974 | Giffen et al. |
| 3,931,438 A | 1/1976 | Beall et al. |
| 4,102,664 A | 7/1978 | Dumbaugh, Jr. |
| 4,214,886 A | 7/1980 | Shay et al. |
| 4,361,429 A | 11/1982 | Anderson et al. |
| 4,749,400 A * | 6/1988 | Mouly .................... C03B 21/04 65/105 |
| 5,139,552 A | 8/1992 | Yoshizawa et al. |
| 5,342,426 A | 8/1994 | Dumbaugh, Jr. |
| 5,559,060 A | 9/1996 | Dumbaugh, Jr. et al. |
| 5,678,744 A | 10/1997 | Nakamura |
| 6,064,040 A | 5/2000 | Muller et al. |
| 6,423,930 B1 | 7/2002 | Matsumoto |
| 6,812,430 B2 | 11/2004 | Kang et al. |
| 7,000,433 B1 | 2/2006 | Lisec |
| 7,201,965 B2 | 4/2007 | Gulati et al. |
| 7,514,149 B2 | 4/2009 | Bocko et al. |
| 7,820,941 B2 | 10/2010 | Brown et al. |
| 7,895,861 B2 | 3/2011 | Chalk et al. |
| 7,908,885 B2 | 3/2011 | Devitt |
| 8,007,913 B2 | 8/2011 | Coppola et al. |
| 8,051,681 B2 | 11/2011 | Dahroug et al. |
| 8,292,141 B2 | 10/2012 | Cox et al. |
| 8,656,738 B2 | 2/2014 | Joseph, II et al. |
| 2006/0042314 A1 | 3/2006 | Abbott, III et al. |
| 2006/0261118 A1 | 11/2006 | Cox et al. |
| 2007/0039990 A1 | 2/2007 | Kemmerer et al. |
| 2008/0276785 A1 | 11/2008 | Dahroug et al. |
| 2009/0107182 A1 | 4/2009 | Anderson et al. |
| 2009/0126403 A1 | 5/2009 | Abramov et al. |
| 2010/0102042 A1 * | 4/2010 | Garner ................ C03B 33/0215 219/121.68 |
| 2010/0107848 A1 | 5/2010 | Joseph, II et al. |
| 2010/0212361 A1 | 8/2010 | Abramov et al. |
| 2010/0319401 A1 | 12/2010 | Coffey et al. |
| 2011/0094267 A1 | 4/2011 | Aniolek et al. |
| 2011/0265519 A1 | 11/2011 | Delia et al. |
| 2012/0024928 A1 | 2/2012 | Matsumoto et al. |
| 2012/0131962 A1 | 5/2012 | Mitsugi et al. |
| 2012/0247154 A1 * | 10/2012 | Abramov ............. C03B 33/0235 65/54 |
| 2014/0141217 A1 * | 5/2014 | Gulati ..................... C03C 3/091 428/212 |
| 2015/0191388 A1 * | 7/2015 | Abramov ............. C03B 33/091 65/29.18 |
| 2015/0315059 A1 * | 11/2015 | Abramov ............. B65G 49/065 65/176 |

FOREIGN PATENT DOCUMENTS

| | | |
|---|---|---|
| CN | 202968366 U | 6/2013 |
| DE | 2548748 A1 | 5/1977 |
| EP | 2505566 A1 | 3/2012 |
| JP | 199179700 A | 7/1999 |
| JP | 05437333 B2 | 3/2014 |
| WO | 0034194 | 6/2000 |
| WO | 2010061238 A1 | 6/2010 |
| WO | 2012158232 A2 | 11/2012 |
| WO | 2012169025 A1 | 12/2012 |

OTHER PUBLICATIONS

The International Search Report and Written Opinion, dated Mar. 11, 2015, pp. 1-13, International Application No. PCT/US2014/067613, International filing date Nov. 26, 2014, European Patent Office, The Netherlands.

English Translation of CN201480074716.4 Notice of First Office Action dated March 19, 2018, 9 Pages; Chinese Patent Office.

* cited by examiner

APPARATUS AND METHOD FOR SEVERING A MOVING RIBBON OF INORGANIC MATERIAL

This application claims the benefit of priority under 35 U.S.C. § 371 of International Application No. PCT/US2014/067613, filed on Nov. 26, 2014, which claims the benefit of priority under 35 U.S.C. § 119 to U.S. Provisional Application No. 61/911085, filed on Dec. 3, 2013, the content of each of which is relied upon and incorporated herein by reference in its entirety.

BACKGROUND

1. Field

This disclosure relates to moving ribbons of inorganic material, and more particularly to an apparatus and method for severing a moving ribbon of inorganic material.

2. Technical Background

A moving ribbon of glass can be formed using a variety of different processes. The moving ribbon of glass can be severed to form a glass sheet. The glass sheet can be further processed (e.g., during a cutting or molding process) to form a glass article.

SUMMARY

Disclosed herein is a method comprising indirectly engaging a surface of a moving ribbon of inorganic material with a non-contacting support unit. The ribbon is severed with a thermal separating unit while the non-contacting support unit is indirectly engaged with the ribbon.

Also disclosed herein is an apparatus comprising a non-contacting support unit configured to indirectly engage a surface of a moving ribbon of inorganic material, and a thermal separating unit configured to apply heat selectively to a target region of the ribbon.

Also disclosed herein is a method comprising positioning a non-contacting support frame adjacent to a perimeter of a sheet to be separated from a moving ribbon of inorganic material. A surface of the ribbon is indirectly engaged with the non-contacting support frame. A thermal separating frame is positioned within a window of the non-contacting support frame indirectly engaged with the surface of the ribbon. Heat is applied to the ribbon along the perimeter of the sheet with the thermal separating frame to separate the sheet from the ribbon. The separated sheet is removed away from the ribbon.

Also disclosed herein is a method comprising selectively applying heat to a surface of a moving ribbon of inorganic material along a perimeter of a sheet to be separated from the ribbon with a thermal separating frame.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Figure 1:
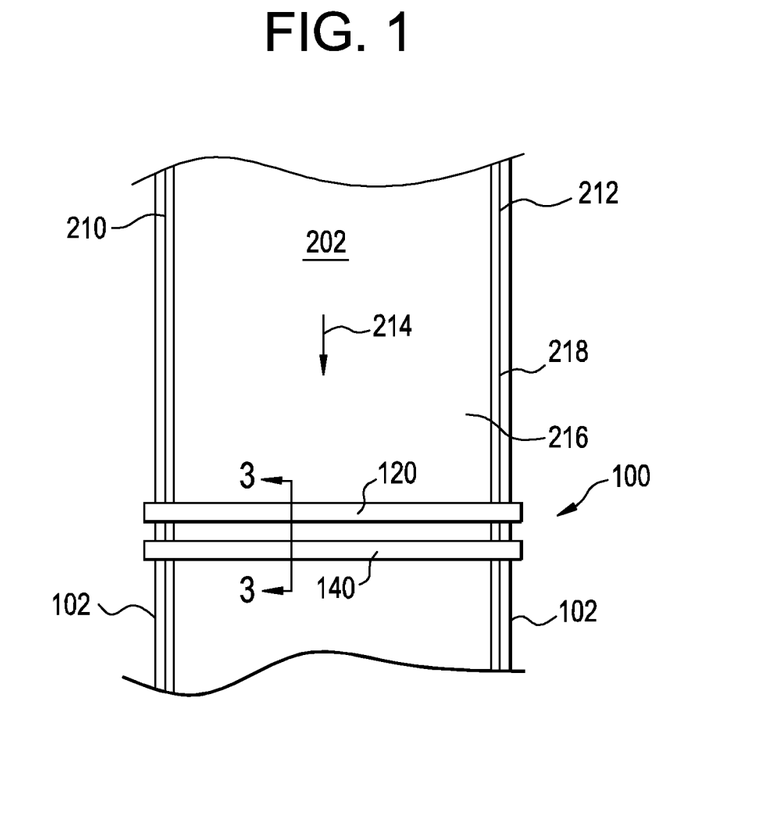
FIG. 1 is an elevation view of one exemplary embodiment of an apparatus for severing a moving ribbon.

FIG. 1 shows one exemplary embodiment of an apparatus 100 for separating a sheet from a moving ribbon of inorganic material. Apparatus 100 comprises a non-contacting support unit 120 and a thermal separating unit 140. Non-contacting support unit 120 is configured to indirectly engage the moving ribbon with positive and/or negative pressure and without directly contacting the moving ribbon. Such indirect engagement can aid in positioning an indirectly engaged segment of the moving ribbon along a vertical plane during severing of the moving ribbon. Thermal separating unit 140 is configured to apply heat to the moving ribbon to aid in severing the moving ribbon.

Figure 2:
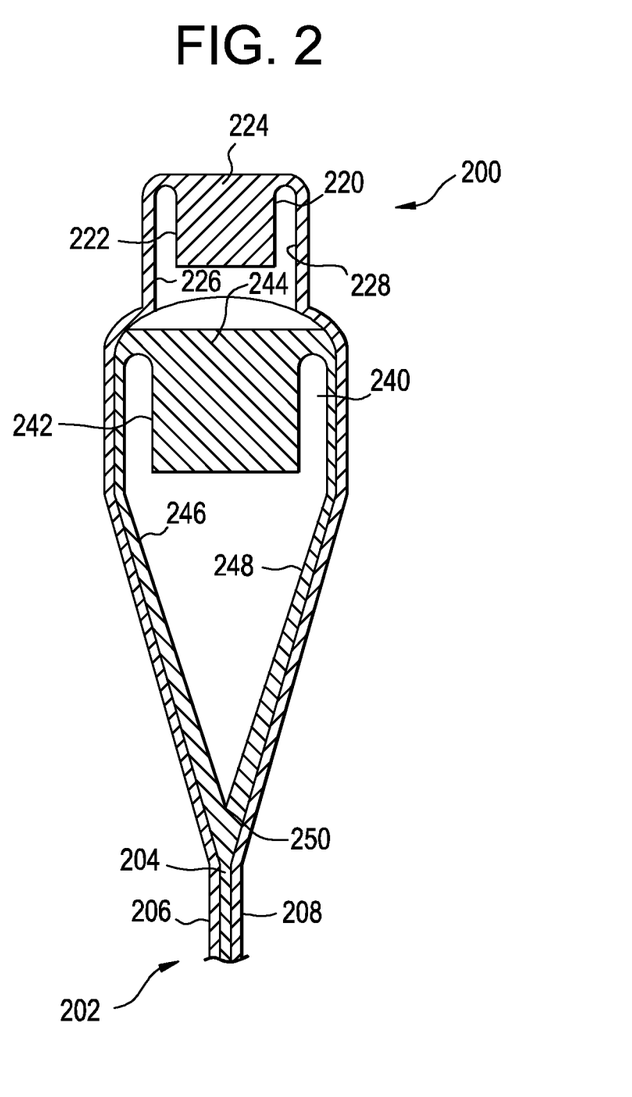
FIG. 2 is a cross-sectional view of one exemplary embodiment of a forming apparatus for forming a moving ribbon.

The moving ribbon of inorganic material can comprise glass materials, glass-ceramic materials, or combinations thereof. The moving ribbon can be formed using any suitable process (e.g., fusion-draw, down-draw, up-draw, slot-draw, or float processes). FIG. 2 illustrates one exemplary embodiment of a forming apparatus 200 that can be used to form a moving ribbon such as, for example, a moving ribbon 202 of laminated glass. In some embodiments, moving ribbon 202 is formed using forming apparatus 200 as part of a fusion-draw process. Apparatus 200 can be configured as described in U.S. Pat. No. 4,214,886, which is incorporated herein by reference in its entirety. For example, apparatus 200 comprises an upper overflow distributor 220 positioned above a lower overflow distributor 240. Upper overflow distributor 220 comprises a trough 222. A glass composition 224 is melted and fed into trough 222 in a viscous state. Lower overflow distributor 240 comprises a trough 242. A glass composition 244 is melted and fed into trough 242 in a viscous state.

Glass composition 244 overflows trough 242 and flows down opposing outer forming surfaces 246 and 248 of lower overflow distributor 240. Outer forming surfaces 246 and 248 converge at a draw line 250. The separate streams of glass composition 244 flowing down respective outer forming surfaces 246 and 248 of lower overflow distributor 240 converge at draw line 250 where they are fused together to form a core layer 204 of moving ribbon 202.

Glass composition 224 overflows trough 222 and flows down opposing outer forming surfaces 226 and 228 of upper overflow distributor 220. Glass composition 224 is deflected outward by upper overflow distributor 220 such that glass composition 224 flows around lower overflow distributor 240 and contacts glass composition 244 flowing over outer forming surfaces 246 and 248 of the lower overflow distributor. The separate streams of glass composition 224 are fused to the respective separate streams of glass composition 244 flowing down respective outer forming surfaces 246 and 248 of lower overflow distributor 240. Upon convergence of the streams of glass composition 244 at draw line 250, glass composition 224 forms a first cladding layer 206 and a second cladding layer 208 of moving ribbon 202. Moving ribbon 202 travels away from draw line 250 of lower overflow distributor 240 as shown in FIG. 2. In some embodiments, moving ribbon 202 cools as it travels away from lower overflow distributor 240. Upon cooling, moving ribbon 202 becomes brittle. In some embodiments, moving ribbon 202 becomes brittle prior to being severed to remove a sheet from the moving ribbon as further described below.

Core layer 204 is disposed between cladding layers 206 and 208. In some embodiments, cladding layers 206 and 208 are exterior layers as shown in FIG. 2. Core layer 204 comprises a first major surface and a second major surface opposite the first major surface. In some embodiments, first cladding layer 206 is fused to the first major surface of core layer 204. Additionally, or alternatively, second cladding layer 208 is fused to the second major surface of core layer 204. In some of such embodiments, the interface between first cladding layer 206 and core layer 204 and/or between second cladding layer 208 and core layer 204 is free of any bonding material such as, for example, an adhesive, a coating layer, or any other material configured to adhere the respective cladding layer to the core layer. Thus, one or both of cladding layers 206 and 208 are fused directly to core layer 204.

In some embodiments, moving ribbon 202 is configured as a moving ribbon of strengthened glass. In such embodiments, moving ribbon 202 is severed, as further described below, to form a sheet of strengthened glass. In some embodiments, cladding layers 206 and 208 are formed from a glass composition comprising a different average coefficient of thermal expansion (CTE) than core layer 204. For example, in some embodiments, glass composition 224 that forms cladding layers 206 and 208 comprises a lower CTE than glass composition 244 that forms core layer 204. The mismatched CTE (i.e., the difference between the CTE of cladding layers 206 and 208 and the CTE of core layer 204) results in formation of compressive stress in the cladding layers and/or formation of tensile stress in the core layer upon cooling of moving ribbon 202.

Although moving ribbon 202 is shown in FIG. 2 as comprising three layers, other embodiments also are disclosed herein. In other embodiments, a moving ribbon can comprise any suitable number of layers, such as two, four, or more layers. In embodiments in which the moving ribbon comprises more than three layers, one or more intermediate layers are disposed between the core layer and one of the cladding layers. Thus, in some embodiments, the cladding layers are exterior layers regardless of the total number of layers comprised in the moving ribbon. In other embodiments the moving ribbon comprises a single layer, i.e., the moving ribbon is non-laminated.

As shown in FIG. 1, in some embodiments, moving ribbon 202 comprises a bead extending longitudinally along one or both of opposing side edges 210 and 212 of the moving ribbon. A central area of moving ribbon 202 is disposed between side edges 210 and 212. For example, in some embodiments, the central area is disposed between the beads. The beads are portions of moving ribbon 202 that are thicker than the central area of the moving ribbon. Moving ribbon 202 moves in a traveling direction 214 at a traveling velocity v. In some embodiments, traveling direction 214 is a downward direction. Thus, moving ribbon 202 moves downward away from forming apparatus 200 (e.g., under the force of gravity and/or one or more pulling rollers).

In some embodiments, apparatus 100 is coupled to a structure and positioned adjacent to a first outer surface 216 of moving ribbon 202. Apparatus 100 is configured to move in conjunction with and/or relative to moving ribbon 202. For example, in some embodiments, apparatus 100 is movable in upward and downward directions. In some embodiments, the structure comprises one or more rails such as, for example, side rails 102 as shown in FIG. 1. Side rails 102 extend vertically adjacent to moving ribbon 202. Apparatus 100 is movably mounted on side rails 102 such that apparatus 100 is movable longitudinally along the side rails in the upward and downward directions. In some embodiments, non-contacting support unit 120 and thermal separating unit 140 are movably mounted on side rails 102 independently of one another. In other embodiments, non-contacting support unit 120 and thermal separating unit 140 are mounted on a carriage that is mounted on side rails 102. The carriage is movable relative to side rails 102 to move non-contacting support unit 120 and thermal separating unit 140 together with one another. In some embodiments, apparatus 100, or components thereof, are movable in forward and backward directions relative to moving ribbon 202. Such movement can enable non-contacting support unit 120 and/or thermal separating unit 140 to engage and disengage from moving ribbon 202 as further described below.

Figure 3:
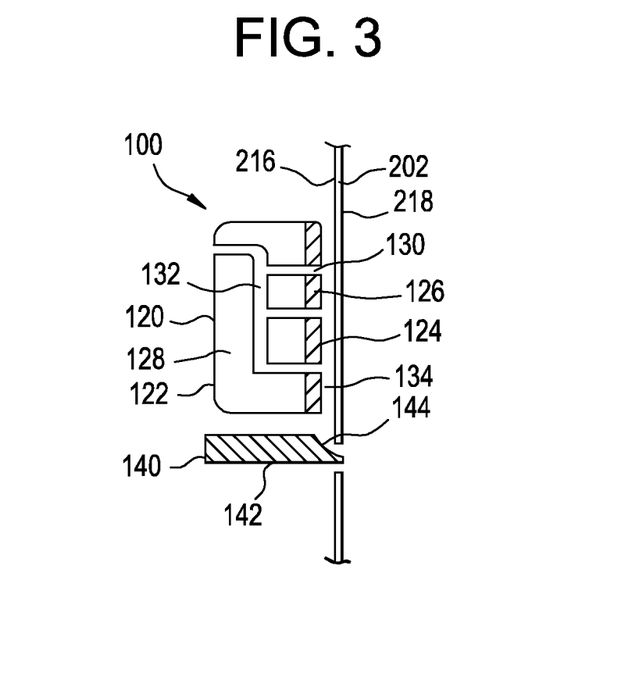
FIG. 3 is a cross-sectional view taken along line 3-3 of FIG. 1.
Figure 4:
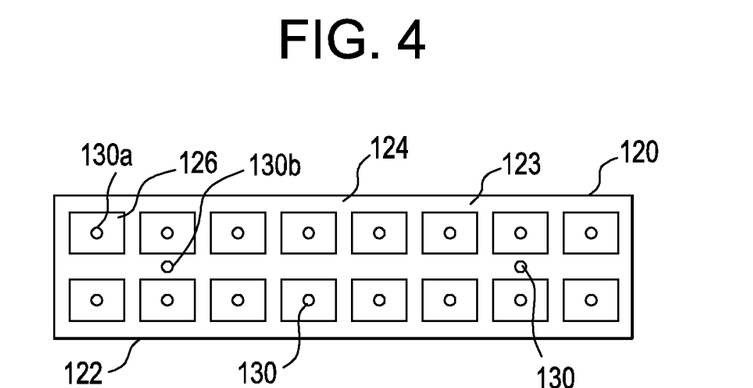
FIG. 4 is a perspective view of one exemplary embodiment of a non-contacting support unit.

FIG. 3 is a cross-sectional view of apparatus 100 and moving ribbon 202 taken along line 3-3 of FIG. 1, and FIG. 4 shows one exemplary embodiment of non-contacting support unit 120. Non-contacting support unit 120 comprises a housing 122. In some embodiments, housing 122 comprises a box-like shape. For example, in some of such embodiments, housing 122 is shaped substantially as a rectangular prism as shown in FIGS. 3-4 in which the housing comprises six walls. The six walls comprise four sidewalls and two end walls. In other embodiments, the housing can comprise another suitable shape (e.g., a cylinder, an ellipsoid, a triangular prism, or a pentagonal prism). At least a portion of an external surface of housing 122 is configured as an engaging surface 124. For example, in some embodiments, a housing sidewall 123 comprises engaging surface 124 as shown in FIGS. 3-4. Non-contacting support unit 120 is positioned such that engaging surface 124 is adjacent to and facing first outer surface 216 of moving ribbon 202 to enable the non-contacting support unit to indirectly engage the moving ribbon as further described below.

In some embodiments, non-contacting support unit 120 comprises one or more positive pressure openings in engaging surface 124. The positive pressure openings are in fluid communication with a positive pressure plenum 128. In some embodiments, positive pressure plenum 128 is disposed within housing 122 as shown in FIGS. 3-4. In other embodiments, the positive pressure plenum is disposed outside of the housing. A pressurized fluid (e.g., air) can be introduced into positive pressure plenum 128 and out of housing 122 through the positive pressure openings as further described below. In some embodiments, engaging surface 124 comprises a diffusing member 126 disposed in a surface of housing 122 (e.g., in housing sidewall 123). For example, diffusing member 126 is disposed in a positive pressure opening in engaging surface 124 such that an external surface of the diffusing member is substantially coplanar with an external surface of housing sidewall 123. In some embodiments, diffusing member 126 is formed from a porous material (e.g., a porous graphite material) comprising a plurality of openings extending therethrough. The pressurized fluid exiting housing 122 through the positive pressure opening passes through the openings of diffusing member 126, which can aid in dispersing the fluid over a larger area. In some embodiments, non-contacting support unit 120 comprises a plurality of diffusing members 126 positioned at various locations along engaging surface 124 as shown in FIG. 4.

In some embodiments, non-contacting support unit 120 comprises one or more negative pressure openings 130 in engaging surface 124 as shown in FIGS. 3-4. Negative pressure openings 130 are in fluid communication with a negative pressure plenum 132. In some embodiments, negative pressure plenum 132 is disposed within the housing 122 as shown in FIGS. 3-4. In other embodiments, the negative pressure plenum is disposed outside of the housing. In some embodiments, non-contacting support unit 120 comprises a plurality of negative pressure openings 130, each in fluid communication with negative pressure plenum 132. Negative pressure openings 130 can be positioned at any suitable locations on engaging surface 124. For example, in some embodiments, a negative pressure opening 130a extends through engaging surface 124 at a diffusing member 126. Additionally, or alternatively, a negative pressure opening 130b extends through engaging surface 124 between diffusing members 126. In some embodiments, negative pressure plenum 132 is configured as a tubular conduit positioned within positive pressure plenum 128 and fluidly coupled to negative pressure openings 130. A negative pressure can be drawn on negative pressure plenum 132 to draw a fluid (e.g., air) from outside of housing 122 through negative pressure openings 130 and into the negative pressure plenum as further described below.

In some embodiments, thermal separating unit 140 comprises a blade member as shown in FIGS. 1 and 3. The blade member comprises a body portion 142 and a tapered cutting portion 144 extending from the body portion. Cutting portion 144 is configured to engage and apply heat to moving ribbon 202 to sever the moving ribbon as further described below. In other embodiments, the thermal separating unit can be configured, for example, as a heated rod (e.g., a calrod), a heated wire (e.g., a nichrome wire), a torch, a laser, or another heating unit configured to apply heat selectively to moving ribbon 202 along a target region to sever the moving ribbon.

In some embodiments, apparatus 100 is positioned adjacent to first outer surface 216 of moving ribbon 202 as shown in FIGS. 1 and 3. In some embodiments, non-contacting support unit 120 extends transversely along substantially the entire width of moving ribbon 202 between side edges 210 and 212 as shown in FIG. 1. Alternatively, in other embodiments, the non-contacting support unit extends along less than the entire width of the moving ribbon. For example, in some embodiments, the non-contacting support unit extends along substantially the entire width of the central area of the moving ribbon without extending along a width of the beads. Thus, the non-contacting support unit is sized to indirectly engage the central area of the moving ribbon without engaging the beads. In some embodiments, thermal separating unit 140 extends along substantially the entire width of moving ribbon 202 as shown in FIG. 1. Alternatively, in other embodiments, the thermal separating unit extends along less than the entire width of the moving ribbon. In some embodiments, non-contacting support unit 120 and thermal separating unit 140 are positioned adjacent to one another. Non-contacting support unit 120 can be positioned above thermal separating unit 140 as shown in FIG. 1 and/or below the thermal separating unit.

Non-contacting support unit 120 indirectly engages moving ribbon 202. Non-contacting support unit 120 is positioned such that engaging surface 124 is adjacent to and facing first outer surface 216 of moving ribbon 202 as shown in FIG. 3. A fluid (e.g., air) can be introduced into positive pressure plenum 128 to build pressure therein. The pressurized fluid exits housing 122 of non-contacting support unit 120 through the positive pressure openings. Engaging surface 124 of non-contacting support unit 120 is spaced away from moving ribbon 202 by a space 134. Upon exiting housing 122, the pressurized fluid is introduced into space 134 between engaging surface 124 and moving ribbon 202. One or more positive pressure regions can be established in space 134. In some embodiments, the positive pressure regions are substantially aligned with the positive pressure openings. For example, the positive pressure regions are disposed within space 134 at substantially the same longitudinal and transverse positions relative to moving ribbon 202 as the positive pressure openings. Moving ribbon 202 is urged away from engaging surface 124 at the positive pressure regions. In other words, the pressurized fluid flowing out of the positive pressure openings tends to push moving ribbon 202 in a direction away from engaging surface 124. Diffusing members 126 can aid in dispersing the fluid exiting housing 122. Thus, diffusing members 126 can aid in spreading the positive pressure regions more evenly within space 134 between engaging surface 124 and moving ribbon 202, which can result in a more uniform force along the width of the indirectly engaged region of the moving ribbon.

A negative pressure can be drawn on negative pressure plenum 132 to cause fluid (e.g., air) to be withdrawn from space 134 between engaging surface 124 and moving ribbon 202, through negative pressure openings 130, and into the negative pressure plenum. Thus, one or more negative pressure regions can be established in space 134. In some embodiments, the negative pressure regions are substantially aligned with negative pressure openings 130. For example, the negative pressure regions are disposed within space 134 at substantially the same longitudinal and transverse positions relative to moving ribbon 202 as negative pressure openings 130. Moving ribbon 202 is urged toward engaging surface 124 at the negative pressure regions. In other words, the fluid flowing into negative pressure openings 130 tends to pull moving ribbon 202 in a direction toward engaging surface 124. In some embodiments, negative pressure openings 130 are positioned at various locations about engaging surface 124, which can aid in spreading the negative pressure regions more evenly within space 134 between the engaging surface and moving ribbon 202 and can result in a more uniform force along the width of the indirectly engaged region of the moving ribbon.

In some embodiments, space 134 between engaging surface 124 and moving ribbon 202 comprises positive pressure regions and negative pressure regions, which can be formed as described above. The fluid is introduced into space 134 at the positive pressure regions and withdrawn from the space at the negative pressure regions. A fluid cushion (e.g., an air cushion) is formed in space 134. Moving ribbon 202 and engaging surface 124 are separated from one another by the fluid cushion. In some embodiments, the negative pressure regions are holes in the fluid cushion. Moving ribbon 202 is pushed away from engaging surface 124 (e.g., at the positive pressure regions) and/or pulled toward the engaging surface (e.g., at the negative pressure regions). Thus, non-contacting support unit 120 indirectly engages moving ribbon 202. In some embodiments, moving ribbon 202 is pushed away from engaging surface 124 and pulled toward the engaging surface. Thus, the indirect engagement is a push-pull engagement. The indirect engagement is substantially free of physical contact between non-contacting support unit 120 and moving ribbon 202. In other words, moving ribbon 202 is indirectly engaged by non-contacting support unit 120 without physically contacting or bottoming out against the non-contacting support unit.

Establishing the positive pressure regions and the negative pressure regions within space 134 can aid in maintaining a substantially constant spacing between moving ribbon 202 and engaging surface 124 along the indirectly engaged region of the moving ribbon. In some embodiments, engaging surface 124 is substantially planar. Thus, the indirectly engaged region of moving ribbon 202 can be maintained in a substantially planar configuration conforming to engaging surface 124. In some embodiments, indirect engagement of moving ribbon 202 substantially prevents movement of the moving ribbon in the directions toward and away from engaging surface 124 (e.g., backward and forward directions). In some of such embodiments, non-contacting support unit 120 supports moving ribbon 202 to maintain the indirectly engaged region in a substantially vertical plane. Indirect engagement of moving ribbon 202 by non-contacting support unit 120 can aid in preventing forward and/or backward movement of a first portion of the moving ribbon positioned on one side of (e.g., below) the non-contacting support unit from causing forward and/or backward movement of a second portion of the moving ribbon positioned on an opposite side of (e.g., above) the non-contacting support unit. In other words, indirect engagement of moving ribbon 202 by non-contacting support unit 120 can aid in preventing a disturbance at one vertical position along the moving ribbon from propagating to another vertical position along the moving ribbon. In some embodiments, movement of moving ribbon 202 in direction 214 (e.g., the vertical direction) is substantially uninhibited by indirect engagement of the moving ribbon by non-contacting support unit 120.

Apparatus 100 is positioned such that thermal separating unit 140 is aligned with a target region of moving ribbon 202. Upon alignment with the target region thermal separating unit 140 is positioned directly adjacent to or at the same longitudinal and/or transverse position as the target region to enable the thermal separating unit to apply heat to the target region. In some embodiments, the target region extends transversely along the width of moving ribbon 202. Apparatus 100, or a portion thereof, is movable to maintain thermal separating unit 140 in alignment with the target region. For example, in some embodiments, apparatus 100 is moved in direction 214 at velocity v. Thus, thermal separating unit 140 is maintained in alignment with the target region as moving ribbon 202 moves downward away from forming unit 200. In some embodiments, thermal separating unit 140 is movable independently of non-contacting support unit 120. For example, non-contacting support unit 120 can be maintained in a fixed position or moved independently (e.g., in the same or a different direction at the same or a different velocity) of thermal separating unit 140.

In some embodiments, thermal separating unit 140 is movable toward and away from moving ribbon 202 (e.g., in the forward and backward directions). For example, in some of such embodiments, thermal separating unit 140 is movable between a retracted position in which the thermal separating unit is spaced from moving ribbon 202 and an advanced position in which the thermal separating unit is engageable with the moving ribbon. Upon movement of thermal separating unit 140 toward moving ribbon 202, the thermal separating unit engages the moving ribbon at the target region as shown in FIG. 3.

Thermal separating unit 140 is configured to apply heat to moving ribbon 202 (e.g., by conduction, convection, and/or radiation). At least a portion of thermal separating unit 140 (e.g., cutting portion 144) is heated. In some embodiments, thermal separating unit 140 is heated to a temperature, for example, of at least about 600° C., at least about 700° C., at least about 800° C., or at least about 900° C. Thermal separating unit 140 can be heated by any suitable heating mechanism (e.g., induction coils). Upon engaging moving ribbon 202, thermal separating unit 140 applies heat to the target region. Thermal separating unit 140 severs moving ribbon 202 by application of heat and/or mechanical shearing.

In some embodiments, thermal separating unit 140 applies heat selectively to the target region of moving ribbon 202 from first outer surface 216. Applying heat selectively to the target region comprises heating a narrow portion of moving ribbon 202 along the target region without substantially heating remote regions of the moving ribbon spaced away from the target region. In some embodiments, heat is applied selectively to first outer surface 216 of moving ribbon 202 at the target region. For example, in some of such embodiments, first outer surface 216 of moving ribbon 202 is heated to a softening temperature of glass composition 224 of first cladding layer 206. Such selective application of heat forms a thermal gradient across the thickness of moving ribbon 202 (e.g., because heat is applied selectively to first outer surface 216 without also being applied to second outer surface 218). In some embodiments, such selective application of heat reduces the compressive stress in first cladding layer 206 along the target region and/or causes formation of tensile stress in the first cladding layer along the target region. Such reduction of compressive stress and/or formation of tensile stress can aid in severing moving ribbon 202 along the target region.

In some embodiments, moving ribbon 202 is severed substantially spontaneously upon application of heat to the target region. In other embodiments, thermal separating unit 140 is advanced into the thickness of moving ribbon 202 to mechanically shear the heated and/or softened target region of the moving ribbon. In other embodiments, a shock is applied to moving ribbon 202 following application of heat to the target region. For example, in some embodiments, a thermal shock is applied to moving ribbon 202 at the target region following application of heat to the target region. Application of the thermal shock comprises, for example, application of a cooling fluid (e.g., air or water) to moving ribbon 202 at the target region. The cooling fluid has a lower temperature than the heated target region. In some embodiments, the thermal shock causes moving ribbon 202 to be severed along the target region.

In some embodiments, thermal separating unit 140 extends transversely along substantially the entire width of moving ribbon 202 such that severing moving ribbon 202 separates a sheet from the moving ribbon. For example, thermal separating unit 140 severs moving ribbon 202 along substantially the entire width between side edges 210 and 212 to separate the sheet at the bottom portion of the moving ribbon positioned below the thermal separating unit as shown in FIG. 1. Thus, the sheet is cut from the bottom of moving ribbon 202. The sheet can be removed as a finished product and/or for further processing. Application of heat by thermal separating unit 140 can aid in healing an edge of the sheet as further described below.

In some embodiments, non-contacting support unit 120 remains indirectly engaged with moving ribbon 202 during severing of the moving ribbon by thermal separating unit 140. Non-contacting support unit 120 can aid in maintaining moving ribbon 202 in the vertical plane as described above during severing of the moving ribbon. In some embodiments, upon engagement with moving ribbon 202, thermal separating unit 140 exerts a force on the moving ribbon that urges the moving ribbon out of the vertical plane (e.g., away from the thermal separating unit and/or non-contacting support unit 140). Indirect engagement between non-contacting support unit 140 and moving ribbon 202 can aid in counteracting the force of thermal separating unit 140 on the moving ribbon to prevent movement of the portion of the moving ribbon positioned above the non-contacting support unit. Thus, non-contacting support unit 120 can aid in preventing disturbances introduced into moving ribbon 202 by thermal separating unit 140 from propagating along the length of the moving ribbon.

In some embodiments, thermal separating unit 140 is moved away from moving ribbon 202 toward the retracted position after severing the moving ribbon to separate the sheet. Apparatus 100 is moved relative to moving ribbon 202 (e.g., in the upward direction) to reposition the apparatus such that thermal separating unit 140 is aligned with another target region. In some embodiments, non-contacting support unit 120 remains indirectly engaged with moving ribbon 202 during repositioning of apparatus 100. In other embodiments, non-contacting support unit 120 is disengaged from moving ribbon 202 (e.g., by deactivation and/or retraction away from the moving ribbon) during repositioning of apparatus 100. In some embodiments, with thermal separating unit 140 aligned with the target region, the process described above is repeated to separate another sheet from moving ribbon 202.

Figure 5:
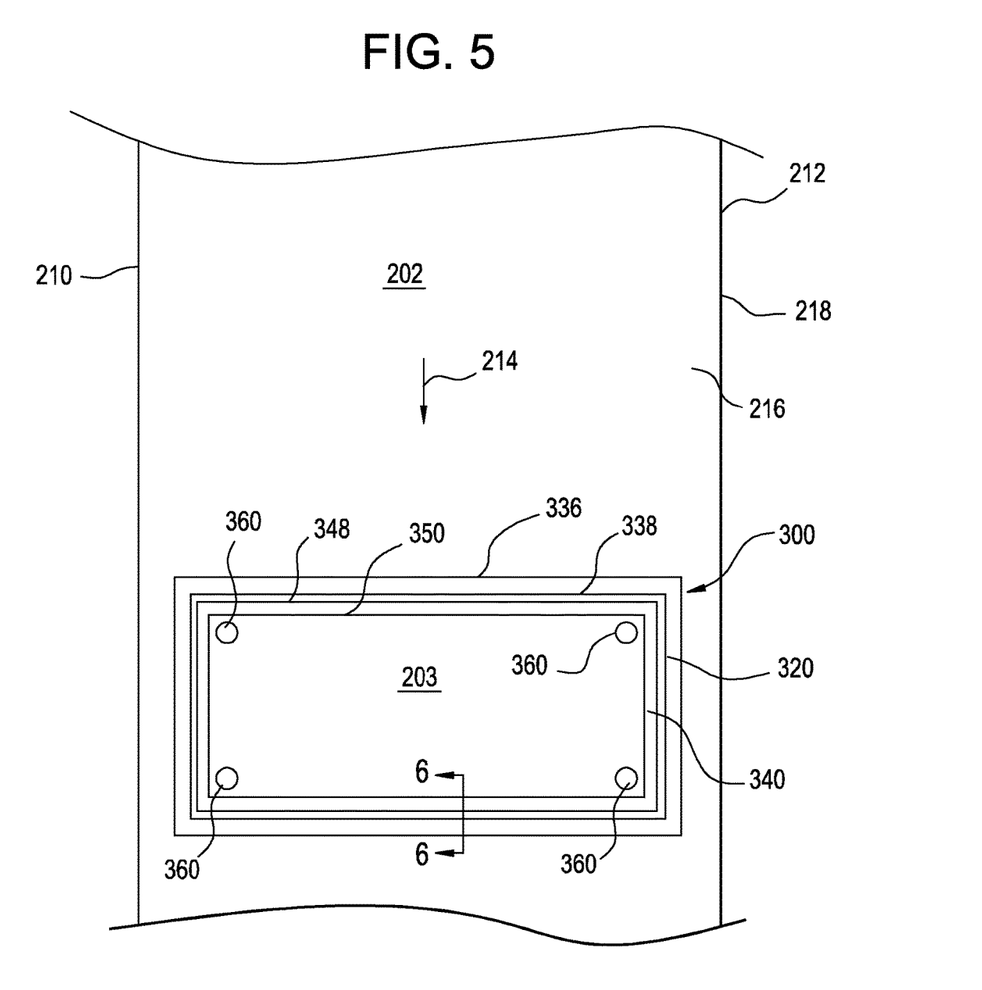
FIG. 5 is an elevation view of another exemplary embodiment of an apparatus for severing a moving ribbon.
Figure 6:
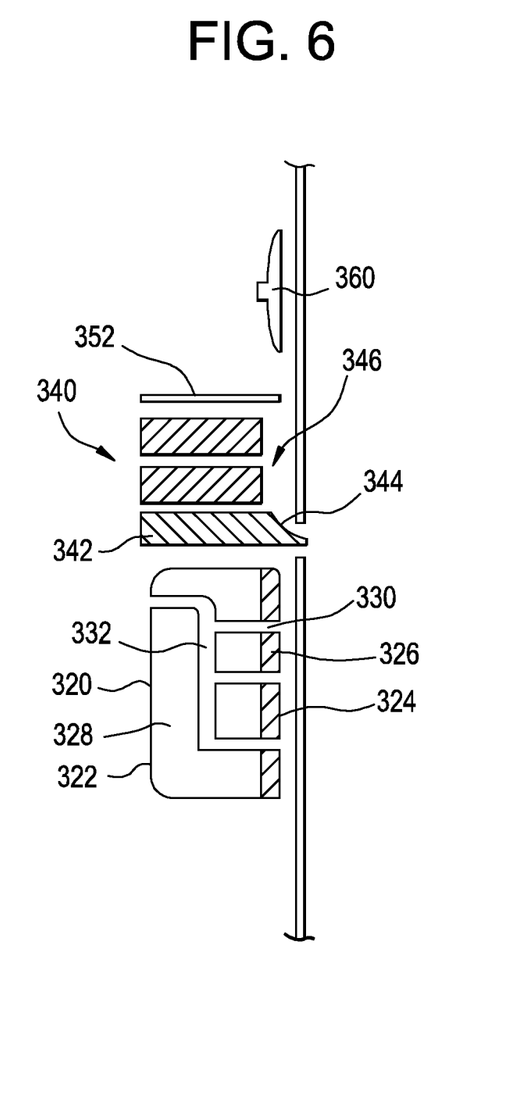
FIG. 6 is a cross-sectional view taken along line 6-6 of FIG. 5.

FIG. 5 shows one exemplary embodiment of an apparatus 300 for separating a sheet from a moving ribbon, and FIG. 6 shows a cross-sectional view taken along line 6-6 of FIG. 5. Apparatus 300 can be used, for example, to separate a sheet 203 from moving ribbon 202 of laminated glass. Apparatus 300 comprises a non-contacting support unit 320 and a thermal separating unit 340. Non-contacting support unit 320 is similar to non-contacting support unit 120 described above with reference to FIGS. 1 and 3-4. For example, non-contacting support unit 320 comprises a housing 322. At least a portion of an external surface of housing 322 is configured as an engaging surface 324. In some embodiments, engaging surface 324 comprises at least one diffusing member 326, which is formed from a porous material including a plurality of openings extending therethrough. The openings of diffusing member 326 are configured as positive pressure openings of non-contacting support unit 320 in fluid communication with a positive pressure plenum 328 disposed within housing 322. A negative pressure opening 330 in engaging surface 324 is in fluid communication with a negative pressure plenum 332 disposed within housing 322.

In some embodiments, non-contacting support unit 320 is configured as a non-contacting support frame as shown in FIG. 5. For example, non-contacting support unit 320 comprises an outer perimeter 336 and an inner perimeter 338. Outer perimeter 336 can have any suitable shape. For example, in some embodiments, outer perimeter 336 is substantially rectangular as shown in FIG. 5. In other embodiments, the outer perimeter can be circular, elliptical, triangular, or can have another polygonal or non-polygonal shape. Inner perimeter 338 can have any suitable shape. For example, in some embodiments, inner perimeter 338 is substantially rectangular as shown in FIG. 5. In other embodiments, the inner perimeter can be circular, elliptical, triangular, or can have another polygonal or non-polygonal shape. In some embodiments, outer perimeter 336 and inner perimeter 338 comprise substantially the same shape. In other embodiments, the outer perimeter and the inner perimeter comprise different shapes. In some embodiments, engaging surface 324 extends between outer perimeter 336 and inner perimeter 338.

A window is formed within inner perimeter 338 of non-contacting support unit 320. Non-contacting support unit 320 at least partially circumscribes the window. In some embodiments, engaging surface 324 at least partially circumscribes the window. In some embodiments, the window has a size and shape substantially corresponding to the desired size and shape of sheet 203. For example, inner perimeter 338 of non-contacting support unit 320 has a shape corresponding to the desired shape of a perimeter of sheet 203 and a size that is slightly larger than the desired size of the perimeter of the sheet. Thus, the indirectly engaged region of moving ribbon 202 can be disposed about the perimeter of sheet 203.

In some embodiments, the non-contacting support frame is formed from a plurality of non-contacting support subunits coupled to one another. For example, in some of such embodiments, non-contacting support unit 320 is formed from four non-contacting support subunits arranged in a rectangular pattern. Each non-contacting support subunit can be configured generally as described above with reference to non-contacting support unit 120. For example, each non-contacting support subunit comprises an elongate, substantially linear unit. In some embodiments, each non-contacting support subunit forms one side of the non-contacting support frame. For example, the four non-contacting support subunits are arranged in a rectangular pattern so that each non-contacting support subunit forms one side of the rectangular non-contacting support frame. Each non-contacting support subunit is coupled to the two adjacent non-contacting support subunits to form the non-contacting support frame. In other embodiments, the non-contacting support unit can be formed from any number of non-contacting support subunits (e.g., one, three, or more) arranged in any pattern.

Thermal separating unit 340 is similar to thermal separating unit 140 described above with reference to FIGS. 1 and 3-4. For example, in some embodiments, thermal separating unit 340 comprises a blade member comprising a body portion 342 and a tapered cutting portion 344 extending from the body portion as shown in FIG. 6. Thermal separating unit 340 comprises a heating element 346. In some embodiments, heating element 346 is positioned adjacent to the blade member as shown in FIG. 6. Heating element 346 is configured to heat the blade member and/or a portion of moving ribbon 202. In some embodiments, heating element 346 comprises induction windings configured to heat the blade member by inductive heating. In some embodiments, the blade member is heated to a temperature sufficient to soften and/or sever moving ribbon 202 upon engagement of the moving ribbon with thermal separating unit 340 as described above.

In some embodiments, thermal separating unit 340 is configured as a thermal separating frame as shown in FIG. 5. For example, thermal separating unit 340 comprises an outer perimeter 348 and an inner perimeter 350. Outer perimeter 348 and inner perimeter 350 can have any suitable shape (e.g., rectangular, circular, elliptical, triangular, or another polygonal or non-polygonal shape). Outer perimeter 348 and inner perimeter 350 can have the same or different shapes. In some embodiments, outer perimeter 348 and inner perimeter 350 are substantially rectangular as shown in FIG. 5.

A window is formed within inner perimeter 350 of thermal separating unit 340. Thermal separating unit 340 at least partially circumscribes the window. The window has a size and shape substantially corresponding to the desired size and shape of sheet 203. For example, in some embodiments, outer perimeter 348 of thermal separating unit 320 has a size and shape corresponding to the desired size and shape of the perimeter of sheet 203. In such embodiments, cutting portion 344 extends along outer perimeter 348 of thermal separating unit 340 as shown in FIG. 6. In other embodiments, the cutting portion can extend along the inner perimeter or along any other portion of the thermal separating frame. Cutting portion 344 has a size and shape corresponding to the desired size and shape of the perimeter of sheet 203. Thus, severing moving ribbon 202 with thermal separating unit 340 severs the moving ribbon along the perimeter of sheet 203 and separates the sheet from the moving ribbon. In some embodiments, the thermal separating frame comprises a die sized and shaped to cut sheet 203 from moving ribbon 202. In other embodiments, a heated rod, a heated wire, a torch, a laser, or another suitable heating unit can extend along the thermal separating frame to apply heat to the moving ribbon along the perimeter of the sheet and separate the sheet from the moving ribbon as described herein.

In some embodiments, thermal separating unit 340 comprises a thermal barrier 352. In some of such embodiments, thermal barrier 352 is positioned within the window of thermal separating unit 340 adjacent to heating element 346 as shown in FIG. 6. Thermal barrier 352 can aid in preventing heat from thermal separating unit 340 (e.g., from heating element 346) from spreading inward into the window of the thermal separating unit. Thus, thermal barrier 352 can aid in enabling thermal separating unit 340 to heat selectively a region of moving ribbon 202 along the perimeter of sheet 203 without heating another region of the moving ribbon spaced away from the perimeter of the sheet.

In some embodiments, non-contacting support unit 320 and thermal separating unit 340 are arranged such that the thermal separating unit is positioned within the window of the non-contacting support unit. Non-contacting support unit 320 is disposed about thermal separating unit 340 as shown in FIG. 5. In some embodiments, apparatus 300 is positioned adjacent to first outer surface 216 of moving ribbon 202 such that non-contacting support unit 320 is adjacent to and extends along substantially the entire perimeter of sheet 203. Non-contacting support unit 320 substantially circumscribes the perimeter of sheet 203. Non-contacting support unit 320 indirectly engages moving ribbon 202 such that the indirectly engaged region of the moving ribbon substantially circumscribes sheet 203. In some embodiments, thermal separating unit 340 extends along substantially the entire perimeter of sheet 203. Thermal separating unit 340 engages moving ribbon 202 to sever the moving ribbon along the perimeter of sheet 203. Sheet 203 is cut from moving ribbon 202 and can be removed as described herein.

Figure 7:
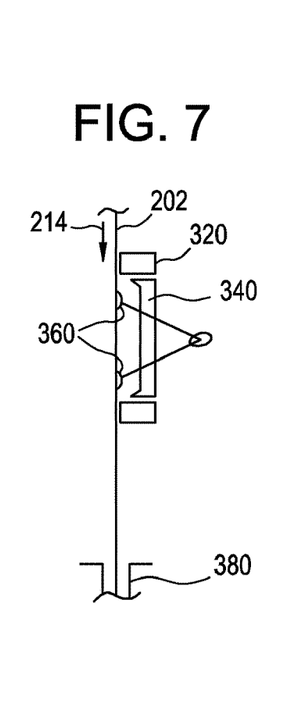
FIGS. 7-11 illustrate exemplary steps involved in the removal of a sheet from a moving ribbon.
Figure 8:
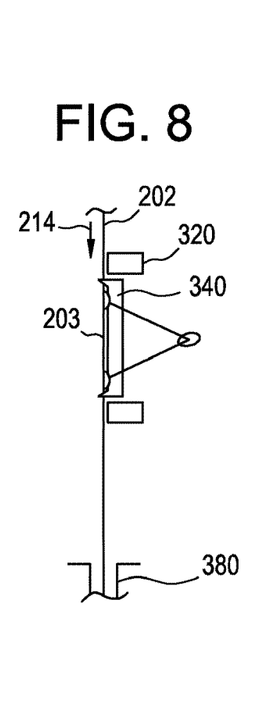

FIGS. 7-11 illustrate one exemplary embodiment of the separation of sheet 203 from moving ribbon 202 using apparatus 300 described above with reference to FIGS. 5-6. For clarity, non-contacting support unit 320 and thermal separating unit 340 are shown in cross-section in FIGS. 7-9 and 11. Apparatus 300 is positioned adjacent to first outer surface 216 of moving ribbon 202 as shown in FIG. 7. Moving ribbon 202 is indirectly engaged by non-contacting support unit 320. In some embodiments, non-contacting support unit 320 comprises a non-contacting support frame as described above. Thus, the indirectly engaged region of moving ribbon 202 substantially circumscribes the perimeter of sheet 203. Non-contacting support unit 320 engages moving ribbon 202 as described above with reference to non-contacting support unit 120. For example, a fluid is introduced into positive pressure plenum 328 and out of the positive pressure openings. In some embodiments, the fluid is heated. For example, the fluid is heated to a temperature of at least about 200° C., at least about 300° C., or at least about 400° C. Thus, heated fluid is directed toward moving ribbon 202. In some embodiments, the fluid is heated to a temperature that is substantially the same as the temperature of the indirectly engaged region of moving ribbon 102. For example, the fluid is heated to a temperature ranging from about 200° C. to about 400° C., about 250° C. to about 350° C., or about 320° C. to about 340° C. In some embodiments, the temperature of moving ribbon 202 at the position (e.g., the longitudinal and/or transverse position) of non-contacting support unit 320 is measured, and the temperature of the fluid is adjusted to substantially match the measured temperature of the moving ribbon. Heating the fluid can aid in preventing thermal shock from being applied to moving ribbon 202 upon indirect engagement by non-contacting support unit 320 (e.g., by directing relatively cool air toward the relatively hot moving ribbon). In some embodiments, heating the fluid causes application of heat to the indirectly engaged region of moving ribbon 202, which is adjacent to the target region, which can aid in preheating the target region prior to engagement of the moving ribbon by thermal separating unit 340 to sever the moving ribbon and/or reducing the thermal gradient between the target region and the indirectly engaged region to reduce the thermal stress on the moving ribbon.

In some embodiments, moving ribbon 202 is engaged by a gripping unit as shown in FIG. 7. For example, sheet 203 is engaged by the gripping unit prior to separation of the sheet from moving ribbon 202 to retain the sheet in position relative to the moving ribbon during severing of the moving ribbon and/or to remove the severed sheet away from the moving ribbon as further described below. In some embodiments, the gripping unit comprises one or more gripping members 360. Gripping members 360 can have any configuration suitable for engaging and gripping sheet 203. In some embodiments, gripping members 360 are configured as suction cups. For example, in some of such embodiments, the gripping unit comprises four suction cups positionable near the four corners of the substantially rectangular sheet 203 as shown in FIGS. 5-7. In other embodiments, the gripping unit can comprise any number of gripping members positionable at any suitable locations along sheet 203. In some embodiments, moving ribbon 202 is directly engaged by the gripping unit. For example, sheet 203 is directly engaged by the gripping unit.

In some embodiments, the gripping unit is movable in conjunction with and/or relative to moving ribbon 202. In some of such embodiments, the gripping unit is mounted on a positioning system (e.g., a robot arm). In some embodiments, apparatus 300 is mounted on the positioning system with the gripping unit so that the apparatus and the gripping unit are movable together in conjunction with and/or relative to moving ribbon 202. In some embodiments, the gripping unit is positioned such that gripping members 360 engage moving ribbon 202 along sheet 203 as shown in FIG. 7. In some of such embodiments, sheet 203 is engaged by the gripping unit after indirect engagement of moving ribbon 202 by non-contacting support unit 320. Thus, non-contacting support unit 320 can aid in preventing a disturbance introduced into moving ribbon 202 by contact with the gripping unit from propagating to portions of the moving ribbon disposed outside of the non-contacting support frame. In some embodiments, the gripping unit is moved with moving ribbon 202 (e.g., in direction 214 at velocity v).

In some embodiments, the target region extends along the perimeter of sheet 203 and is positioned between non-contacting support unit 320 and the gripping unit. Thus, moving ribbon 202 can be supported both outside the perimeter of sheet 203 (e.g., by non-contacting support unit 320) and inside the perimeter of the sheet (e.g., by gripping members 360). Supporting moving ribbon 202 on both sides of the target region can aid in preventing movement of the moving ribbon out of the vertical plane (e.g., forward and/or backward movement) during severing of the moving ribbon as described herein.

In some embodiments, moving ribbon 202 is engaged by thermal separating unit 340. For example, thermal separating unit 340 is moved relative to non-contacting support unit 320 from the retracted position shown in FIG. 7 to the advanced position shown in FIG. 8. Upon engagement by thermal separating unit 340, moving ribbon 202 is severed along the perimeter of sheet 203 as described above (e.g., spontaneously or following application of a shock to the moving ribbon). Sheet 203 is separated from moving ribbon 202. In some embodiments, second outer surface 218 of moving ribbon 202 remains substantially unengaged (e.g., by apparatus 300 and/or the gripping unit) during severing of the moving ribbon. Thus, apparatus 300 can be less complicated to operate compared to a two-sided die configured to engage the moving ribbon from both the first and second outer surfaces to sever the moving ribbon.

Figure 9:
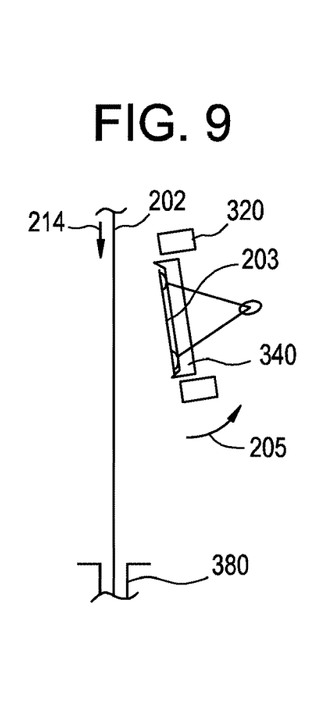
Figure 10:
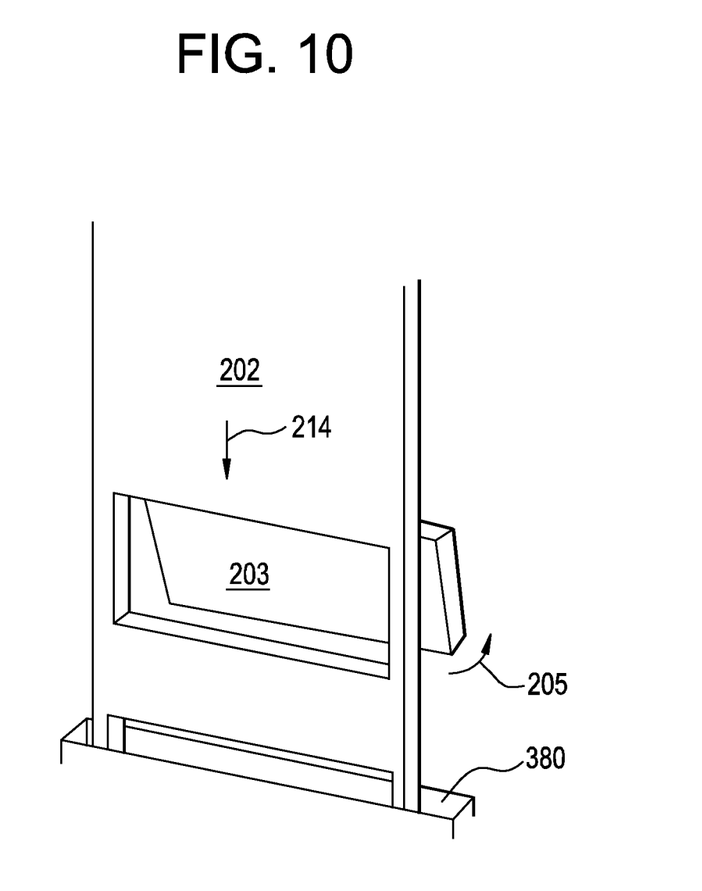
Figure 11:
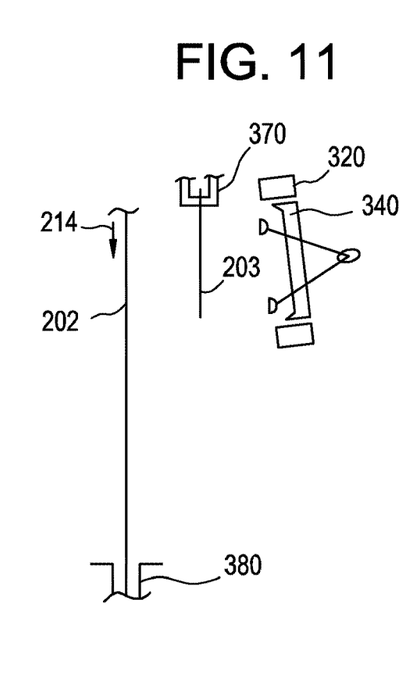

In some embodiments, severed sheet 203 is removed away from moving ribbon 202 as shown in FIGS. 9-10. In some embodiments, non-contacting support unit 320 is disengaged from moving ribbon 202 prior to and/or after removal of severed sheet 203 away from the moving ribbon. For example, non-contacting support unit 320 is deactivated to disengage from moving ribbon 202. In some embodiments, the gripping unit is withdrawn in a direction 205 away from moving ribbon 202. Gripping members 360 remain engaged with sheet 203 during withdrawal of the gripping unit. Sheet 203 is withdrawn away from moving ribbon 202. In some embodiments, apparatus 300 is withdrawn in direction 205. For example, non-contacting support unit 320 and thermal separating unit 340 are withdrawn in direction 205 concurrently with withdrawal of the gripping unit as shown in FIG. 9. Alternatively, in other embodiments, the non-contacting support unit remains indirectly engaged with the moving ribbon, and the thermal separating unit is withdrawn concurrently with withdrawal of the gripping unit. In some embodiments, sheet 203 is placed on a conveying unit 370 as shown in FIG. 11. The gripping unit disengages from sheet 203, and conveying unit 370 transports the sheet for packaging and/or further processing.

In some embodiments, apparatus 300 and/or the gripping unit are repositioned along moving ribbon 202 following removal of severed sheet 203 to sever the moving ribbon at another location and separate another sheet from the moving ribbon. Thus, multiple sheets are separated from a continuously moving ribbon. In some embodiments, the remainder of moving ribbon 202, with sheet 203 removed therefrom, continues to move in direction 214. For example, the remainder of moving ribbon 202 is discharged into a discharge chute 380. In some embodiments, glass material is collected in discharge chute 380 for recycling or disposal. For example, the material collected in discharge chute 380 comprises cullet material that can be melted for reuse.

In some embodiments, a substantially linear non-contacting support unit (e.g., non-contacting support unit 120 described with reference to FIGS. 1 and 3-4) is used with a thermal separating frame (e.g., thermal separating unit 340 described with reference to FIGS. 5-10). For example, one or more substantially linear non-contacting support units are positionable above and/or below the thermal separating frame to stabilize the moving ribbon.

In some embodiments, the thermal separating unit selectively applies heat to the target region of the moving ribbon without substantially urging the moving ribbon out of a reference plane (e.g., the vertical plane). For example, a heated wire is positionable adjacent to the first outer surface of the moving ribbon. The heated wire can be formed into any suitable shape (e.g., substantially linear or rectangular) as described herein. The heated wire gently contacts or remains out of direct contact with the moving ribbon. Thus, the heated wire engages the moving ribbon and selectively applies heat to the target region without substantially urging the moving ribbon in the forward and/or backward directions. In some embodiments, such application of heat causes substantially spontaneous severing of the moving ribbon. In other embodiments, a shock (e.g., a thermal shock) is applied to the moving ribbon to cause severing of the moving ribbon. In some embodiments, the non-contacting support unit is omitted. For example, the non-contacting support unit may be unnecessary to maintain the moving ribbon in position and/or to prevent disturbances from traveling along the moving ribbon (e.g., because of the gentle contact or absence of contact between the thermal separating unit and the moving ribbon).

Figure 12:
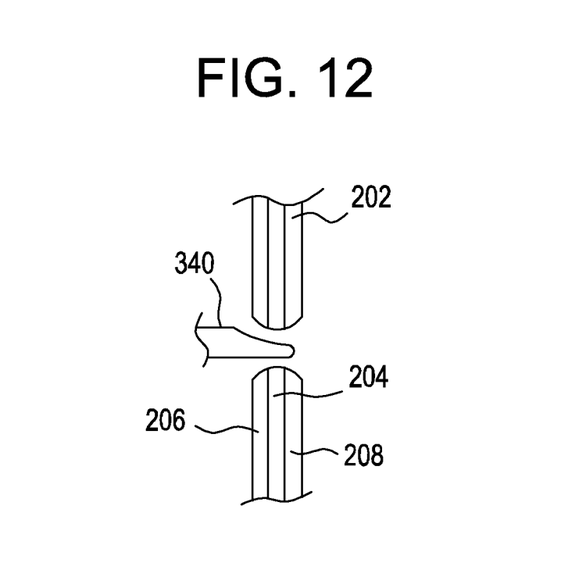
FIG. 12 is a cross-sectional view of one exemplary embodiment of a thermal separating unit severing a moving ribbon.

FIG. 12 is a cross-sectional view of one exemplary embodiment of thermal separating unit 340 severing moving ribbon 202. Application of heat to moving ribbon 202 by thermal separating unit 340 can aid in healing the edge of severed sheet 203. For example, in some embodiments, cracks or flaws that are formed during severing of moving ribbon 202 are subsequently healed by the application of heat to form a finished edge as shown in FIG. 12. This can aid in producing a severed sheet 203 having a finished edge without additional processing following the severing step.

Figure 13:
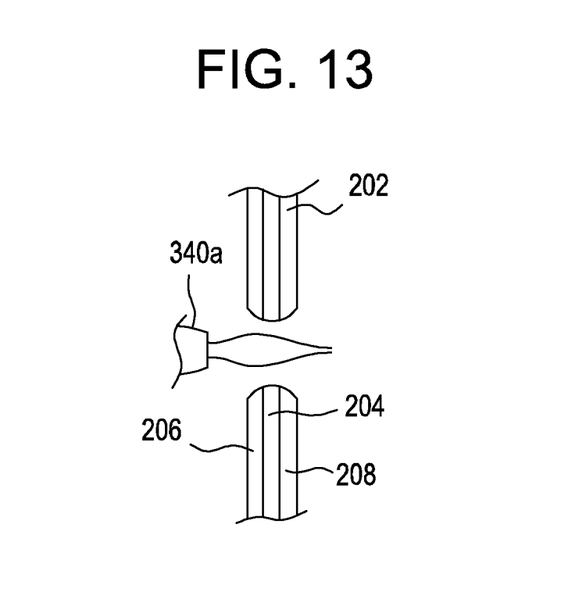
FIG. 13 is a cross-sectional view of another exemplary embodiment of a thermal separating unit severing a moving ribbon.

FIG. 13 is a cross-sectional view of one exemplary embodiment of a thermal separating unit 340a. Thermal separating unit 340a comprises one or more torches configured to apply heat to moving ribbon 202 to sever the moving ribbon as described above with reference to thermal separating units 140 and 340. For example, in some embodiments, thermal separating unit 340*a* comprises a series of torches arranged in a rectangular pattern to form a thermal separating frame as described above. In other embodiments, thermal separating unit 340*a* comprises a torch configured to move along the thermal separating frame to sever the moving ribbon progressively along the perimeter of the sheet. Application of heat to moving ribbon 202 by thermal separating unit 340*a* can aid in healing the edge of severed sheet 203 as described above.

It will be apparent to those skilled in the art that various modifications and variations can be made without departing from the spirit or scope of the invention. Accordingly, the invention is not to be restricted except in light of the attached claims and their equivalents.

What is claimed is:

1. A method comprising:
    indirectly engaging a first surface of a ribbon of inorganic material moving in a downward direction with a non-contacting support frame by establishing a positive pressure region and a negative pressure region within a space between the non-contacting support frame and the first surface of the ribbon and urging the non-contacting support frame and the ribbon away from one another in the positive pressure region and toward one another in the negative pressure region, the non-contacting support frame substantially circumscribing a perimeter of a sheet to be separated from the ribbon; and
    positioning a thermal separating frame in close proximity to the ribbon and selectively applying heat to the first surface of the ribbon along the perimeter of the sheet to separate the sheet from the ribbon while the non-contacting support frame is indirectly engaged with the ribbon, the thermal separating frame comprising a shape corresponding to the perimeter of the sheet to be separated from the ribbon;
    wherein a second surface of the ribbon opposite the first surface remains unengaged by the non-contacting support frame and the thermal separating frame during the indirectly engaging and the positioning.

2. The method of claim 1, wherein:
    the ribbon moves in the downward direction at a velocity; and
    the method further comprises moving the thermal separating frame in the downward direction at the velocity during the severing to maintain alignment between the thermal separating frame and a target region of the ribbon.

3. The method of claim 2, further comprising moving the non-contacting support frame in indirect engagement with the ribbon in the downward direction at the velocity during the severing.

4. The method of claim 1, wherein:
    the indirectly engaging comprises indirectly engaging a first portion of the first surface of the ribbon disposed outside of a perimeter of a sheet to be separated from the ribbon; and
    the method further comprises engaging a second portion of the first surface of the ribbon disposed inside the perimeter of the sheet.

5. The method of claim 1, wherein:
    the severing comprises forming a thermal gradient across a thickness of the ribbon with the thermal separating frame.

6. The method of claim 1, wherein:
    the non-contacting support frame comprises an engaging surface comprising a positive pressure opening and a negative pressure opening;
    establishing the positive pressure region comprises introducing a fluid into the space between the non-contacting support frame and the first surface of the ribbon from the positive pressure opening; and
    establishing the negative pressure region comprises withdrawing a fluid from the space between the non-contacting support frame and the first surface of the ribbon through the negative pressure opening.

7. The method of claim 6, wherein the positive pressure opening comprises a diffusing member comprising a porous material.

8. The method of claim 1, wherein:
    the severing comprises contacting the first surface of the ribbon with the thermal separating frame; and
    the indirect engagement of the ribbon during the contacting prevents a disturbance caused by the contacting from propagating up the ribbon beyond the non-contacting support frame.

9. A method comprising:
    indirectly engaging a first surface of a moving ribbon of strengthened glass with a non-contacting support frame by establishing a positive pressure region and a negative pressure region within a space between the non-contacting support frame and the first surface of the ribbon and urging the non-contacting support frame and the ribbon away from one another in the positive pressure region and toward one another in the negative pressure region, the non-contacting support frame substantially circumscribing a perimeter of a sheet to be separated from the ribbon, the ribbon comprising a core layer disposed between a first cladding layer and a second cladding layer, each of the first cladding layer and the second cladding layer comprising a lower coefficient of thermal expansion than the core layer such that each of the first cladding layer and the second cladding layer comprises a compressive stress and the core layer comprises a tensile stress; and
    selectively applying heat to the first surface of the ribbon along the perimeter of the sheet to be separated from the ribbon with a thermal separating frame while the non-contacting support frame is indirectly engaged with the ribbon to form a thermal gradient across a thickness of the ribbon to reduce the compressive stress of the first cladding layer.

10. The method of claim 9, wherein a second surface of the ribbon opposite the first surface remains unengaged by the non-contacting support frame and the thermal separating frame during the indirectly engaging and the selectively applying heat.

11. The method of claim 10, further comprising directly engaging the sheet to be separated from the ribbon with a gripping unit prior to the selectively applying heat.

* * * * *